UNITED STATES PATENT OFFICE.

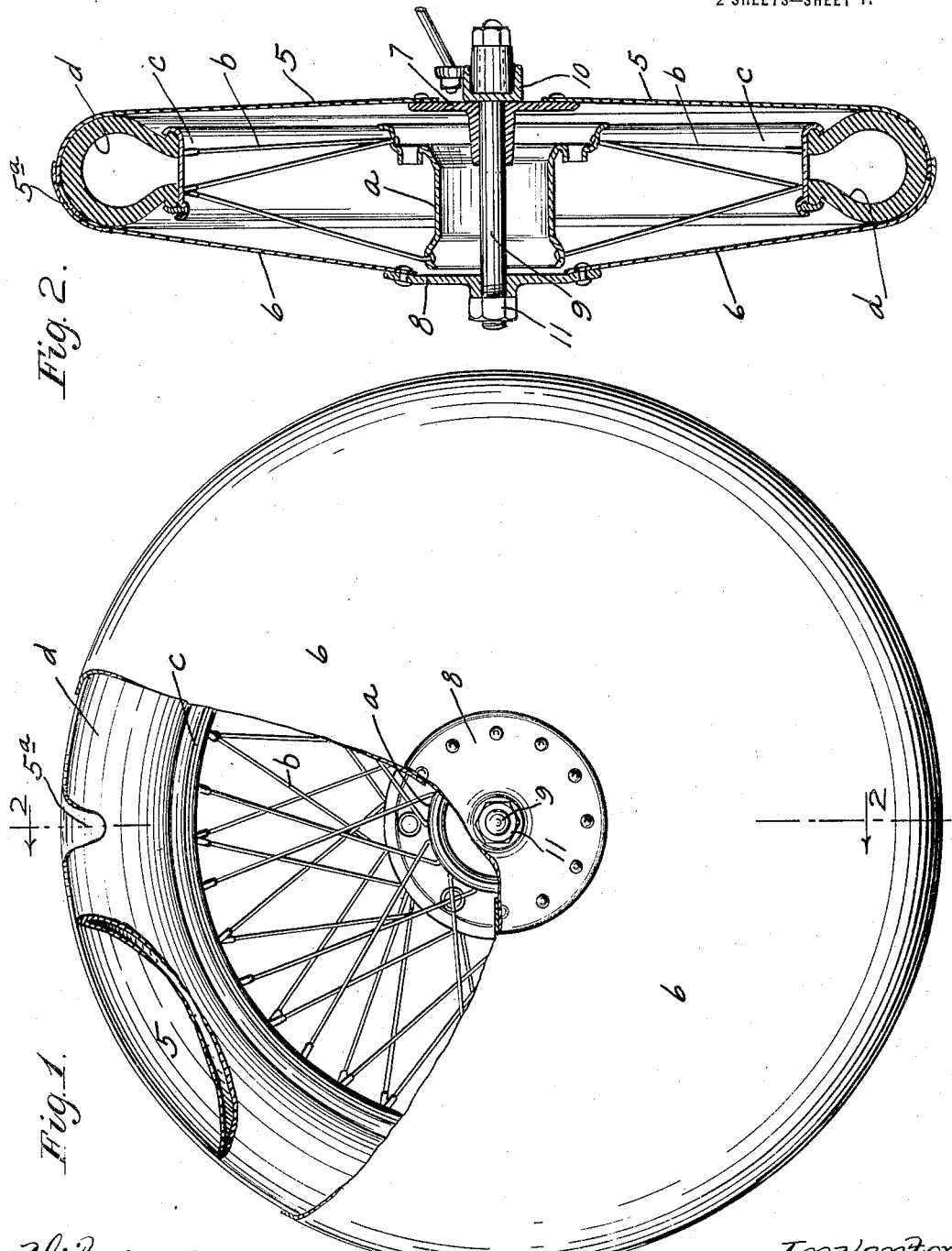

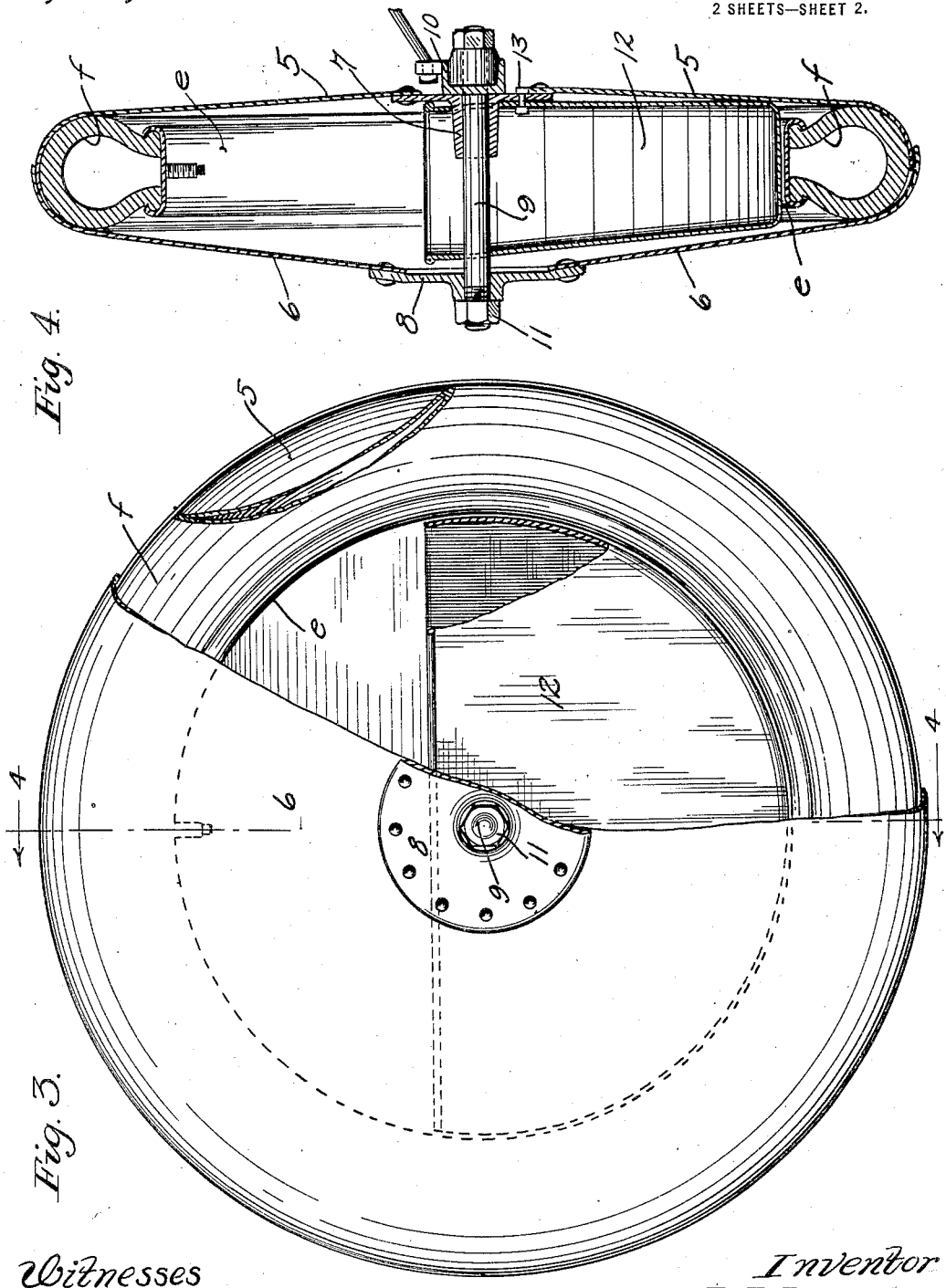

EMIL R. DRAVER, OF RICHMOND, INDIANA.

TIRE-CARRIER.

1,379,297. Specification of Letters Patent. Patented May 24, 1921.

Substitute for application Serial No. 157,971, filed March 28, 1917. This application filed January 3, 1921. Serial No. 434,520½.

*To all whom it may concern:*

Be it known that I, EMIL R. DRAVER, a citizen of the United States, residing at Richmond, in the county of Wayne and State of Indiana, have invented certain new and useful Improvements in Tire-Carriers; and I do hereby declare the following to be a full, clear, and exact description of the invention, such as will enable others skilled in the art to which it appertains to make and use the same.

My present invention has for its object to provide what may be broadly treated as an extra tire carrier, this term being used in a broad sense to include tire carriers regardless of whether they are mounted on an extra wheel, or on an extra demountable rim. The so-called carrier also serves as a tire cover. It is of such character that it may be used, at will, either to carry and inclose a tire equipped extra wheel or a tire equipped extra demountable rim; but in the preferred arrangement, I provide a parcel carrier which, when the device is used to carry a tire equipped demountable rim, may be applied within the inclosing walls of the carrier.

The carrier, as preferably designed, is illustrated in the accompanying drawings wherein like characters indicate like parts throughout the several views.

Referring to the drawings:

Figure 1 is a view in rear elevation showing the improved tire carrier used to carry and inclose an extra tire equipped wire wheel such as used on automobiles, some parts being broken away;

Fig. 2 is a section on the line 2—2 of Fig. 1;

Fig. 3 is a view corresponding to Fig. 1, but showing the carrier used to carry and inclose a tire equipped demountable rim, and also showing the parcel carrier inclosed within the walls of the carrier; and Fig. 4 is a sectional view taken on line 4—4 of Fig. 3.

This application is filed as a substitute for the application filed March 28th, 1917, S. N. 157,971, which has become abandoned.

Referring first to the construction illustrated in Figs. 1 and 2, the numeral 5 indicates the inner or back plate and the numeral 6 the outer plate of the carrier, both of which are preferably pressed from sheet metal, and made reversely concavo-convex to give increased strength and also to give the proper form for carrying a wheel equipped tire, such as shown. These two plates 5 and 6 are formed with laterally curved annular rim portions that are made to telescope, one within the other, the flange of the removable outer plate 6, being overlapped with that of the back plate. The relatively fixed back plate 5 is riveted or otherwise rigidly secured to the annular flange of a hub 7, and the removable outer plate 6 is riveted or otherwise rigidly secured to the annular flange of a hub 8. These two hubs 7 and 8 are telescoped onto a fixed spindle or bolt 9, which is rigidly secured to a suitable fixed support such as a channel-bar 10 which will preferably be located at the rear of an automobile, and rigidly secured either to the body or to the frame thereof. The outer end of the spindle 9 is threaded and is provided with a nut 11. The hub 7 of the back plate may be rigidly secured to the fixed bar 10, but it is not necessary that it should be thus secured. Preferably, the curved rim flange of the back plate 5 at its upper portion is provided with an extended curved retaining finger 5ª for a purpose which will presently appear.

In Figs. 1 and 2, $a$ indicates the hub, $b$ the spokes, $c$ the rim, and $d$ the tire of the extra wheel. This wheel, as shown, is of a well known type, and the said hub is a large cylindrical structure which will go over the spindle with very great clearance so that when the wheel is applied, as shown in Figs. 1 and 2, the wheel will not be supported at all by the said spindle, but will be supported by engagement of the tire with the curved rims of the front and back plates.

In the drawings the tire is shown as of the largest size that would go into the curved rims of the plates, but a tire of considerably less size will be properly held in place, and the wheel will be centered in respect to the spindle by the clamping actions of the curved rims of the two plates. With a smaller tire, the curved rims of the two plates would simply be telescoped or overlapped to a greater extent before they would clamp the tire. The two plates are adapted to be clamped against the tire by tightening the nut 11. When the tire is clamped by the plates, it will be firmly held and the wheel will be held against rattling or jumping. The hub 8 of the removable outer plate 6, it will be noted, does not clamp against the hub of the wheel, but, on the contrary, the wheel is held from its tire. This is found important because the tire, being more or less resilient and non-metallic, will cushion vibrations and thereby relieve the carrier from shocks and prevent noise.

The wheel must, of course, be placed in position in respect to the back plate while, the front plate 6 is removed from the spindle. This may be done by first slipping the upper portion of the tire into place under the retaining finger 5ª and then positioning the lower portion of the tire on the bottom portion of the rim of said back plate. When a wheel is thus applied, it will stay in position and the top thereof will stay in position and will not topple over or require to be held with the hand while the removable plate 6 is being applied.

The same carrier illustrated in Figs. 1 and 2, without change is capable of use to carry a demountable rim e equipped with a tire f, inasmuch as the carrying thereof is from the tire; but, inasmuch as the demountable rim affords an unoccupied space within it, a carrying pocket may be added. The construction illustrated in Figs. 3 and 4 is the same as that illustrated in Figs. 1 and 2 with this carrying pocket added. The carrying pocket, as preferably constructed, is an approximately semi-cylindrical or half drum structure 12, having at the upper central portions of its two walls alined perforations adapting it to be slipped onto the hub 7 and spindle 9. This pocket is of such size that it does not engage with the demountable rim, and it may be gravity suspended from the spindle, but preferably a small nut-equipped bolt 13 is used to rigidly connect the same to the flange of the hub 7.

In reviewing and further considering the construction above described, the following features will be found of especial and great importance.

The wheel or rim, as the case may be, is carried from the tire and not from the hub.

The coöperating carrying plates, to-wit, the so-called back and front plates have reversely flaring rims so that they are adapted to engage and hold tires varying considerably in diameter and center the same.

The clamping plates are rigid so that they afford the desired strength for carrying the tire-equipped wheel or rim.

Means is provided for adjustably forcing the removable front plate toward the relatively fixed back plate, and for holding the same clamped against the tire in different adjustments.

There is a readily removable parcel carrier adapted to be removed when a wheel is to be carried and adapted to be applied when a rim is to be carried.

Obviously, the tire carrier without the parcel carrier may be sold and used, at will, for carrying a tire-equipped wheel or rim, and the parcel carrier can be purchased and added later, if desired.

Moreover, the plates of the carrier afford a rain and dust-proof inclosing casing, and the complete device has a very neat and attractive appearance.

What is claimed is:

1. A tire carrier comprising a supporting member, a spindle fixed in relation thereto, a back plate having a curved peripheral flange adapted to fit about a tire, a front plate detachably applied to the projected end of said spindle, and having a curved peripheral flange adapted to telescope with the flange of said back plate, and means for securing said front plate in different lateral adjustments relative to said back plate.

2. A tire carrier comprising a supporting member, a spindle and back plate in fixed relation thereto, a front plate detachably applied to the projected end of said spindle, said two plates having reversely flaring rim portions adapted to be telescoped and to engage a wheel tire, and means on the end of said spindle for adjustably securing said front plate in different lateral adjustments in respect to said back plate, whereby the rim portions of said two plates may be clamped onto tires varying in size, and the said tire and wheel or rim to which it is applied may be firmly held.

3. A tire carrier comprising a fixed back plate, a removable front plate, means for securing said back plate to a vehicle, said plates having reversely flaring rims engageable with the tire, combined with means for rigidly securing said front plate in respect to said back plate, whereby the marginal portions of said plates will be firmly clamped against a tire, the rims of said two plates overlapping, one with the other, and the rim of said back plate at its upper portion having an extended tire engaging retaining finger.

4. A tire carrier comprising a fixed back plate, a removable front plate, means for securing said back plate to a vehicle, said plates having reversely curved flaring rims engageable with the tire, combined with means for rigidly securing said front plate in respect to said back plate, whereby the marginal portions of said plates will be firmly clamped against a tire, the rims of said two plates overlapping, one with the other.

In testimony whereof I affix my signature.

EMIL R. DRAVER.